US010920119B2

(12) United States Patent
Dunn et al.

(10) Patent No.: US 10,920,119 B2
(45) Date of Patent: Feb. 16, 2021

(54) GASKET MATERIAL AND ITS PROCESS OF PRODUCTION

(75) Inventors: Henry Vincent Dunn, Oldham (GB); Stephen Woolfenden, Rochdale (GB); David Anthony Thomas, Littleborough (GB); John Robert Hoyes, Todmorden (GB)

(73) Assignee: Flexitallic Investments Incorporated, Houston, TX (US)

( * ) Notice: Subject to any disclaimer, the term of this patent is extended or adjusted under 35 U.S.C. 154(b) by 1739 days.

(21) Appl. No.: 11/813,764

(22) PCT Filed: Jan. 11, 2006

(86) PCT No.: PCT/GB2006/000084
§ 371 (c)(1),
(2), (4) Date: Jan. 22, 2008

(87) PCT Pub. No.: WO2006/075149
PCT Pub. Date: Jul. 20, 2006

(65) Prior Publication Data
US 2009/0162672 A1    Jun. 25, 2009

(30) Foreign Application Priority Data
Jan. 11, 2005    (GB) .................................. 0500470.0

(51) Int. Cl.
*C09K 3/10*    (2006.01)

(52) U.S. Cl.
CPC .................................. *C09K 3/1028* (2013.01)

(58) Field of Classification Search
CPC ....... C04B 26/02; C04B 14/204; C04B 18/24; C04B 16/06; F16J 15/102; F16J 15/065; F16J 15/122; F28F 3/10; Y10S 277/919; Y10S 277/936; Y10S 428/92; Y10S 264/44; Y10S 277/938; Y10T 428/251; Y10T 428/25; Y10T 428/252; Y10T 442/53; Y10T 428/256; Y10T 428/31656; Y10T 428/24289; Y10T 428/31707; Y10T 428/30; Y10T 428/269; Y02W 30/97; C09K 2200/0695; C09K 2200/0265; C09K 3/1028; C09K 2200/0243; C09K 2200/0252; C09K 2200/0282; C09K 2200/0607; C09K 2200/023; C09K 3/10; B32B 5/02
USPC ... 428/402, 422, 325, 450, 297.4, 137, 66.4, 428/447, 493, 408, 446, 224, 281, 283, 428/288; 442/322, 376, 417, 136, 133; 277/592, 1, 277, 235 B; 156/242, 243; 162/145, 146, 156, 157.2, 164.1, 181.8, 162/183; 524/445, 442, 444, 446; 523/155, 156

See application file for complete search history.

(56) References Cited

U.S. PATENT DOCUMENTS

| 1,942,704 | A |   | 1/1934  | Hubbard et al. |
|-----------|---|---|---------|----------------|
| 2,136,734 | A | * | 11/1938 | Denman ....................... 428/133 |
| 2,343,368 | A | * | 3/1944  | Daly ............................... 524/76 |
| 3,108,818 | A |   | 10/1963 | Furstenburg |
| 4,042,747 | A |   | 8/1977  | Breton et al. |
| 4,127,277 | A |   | 11/1978 | Owen et al. |
| 4,271,228 | A | * | 6/1981  | Foster et al. .................. 442/322 |
| 4,294,790 | A |   | 10/1981 | Thornley |
| 4,297,139 | A |   | 10/1981 | Beall et al. |
| 4,324,838 | A |   | 4/1982  | Ballard et al. |
| 4,477,094 | A | * | 10/1984 | Yamamoto et al. .......... 277/592 |
| 4,486,235 | A | * | 12/1984 | Kamigaito et al. ...... 106/287.12 |
| 4,486,253 | A |   | 12/1984 | Gonia |
| 4,529,662 | A |   | 7/1985  | Lancaster et al. |
| 4,529,663 | A | * | 7/1985  | Lancaster et al. ............ 428/450 |
| 4,629,199 | A |   | 12/1986 | Yamamoto et al. |
| 4,655,482 | A |   | 4/1987  | Myers et al. |
| 4,720,316 | A | * | 1/1988  | Ruoff ............................ 156/242 |
| 4,762,641 | A |   | 8/1988  | Denton et al. |
| 4,762,643 | A |   | 8/1988  | Bohm et al. |
| 4,778,189 | A |   | 10/1988 | Udagawa |
| 4,780,147 | A |   | 10/1988 | Ou et al. |
| 4,786,670 | A | * | 11/1988 | Tracy ..................... C04B 30/02 277/591 |
| 4,814,215 | A |   | 3/1989  | Lautenschlaeger et al. |
| 4,837,281 | A | * | 6/1989  | Hibbard et al. .............. 525/234 |

(Continued)

FOREIGN PATENT DOCUMENTS

| EP | 0038293      | 10/1981 |
|----|--------------|---------|
| EP | 0326926 A2   | 8/1989  |

(Continued)

OTHER PUBLICATIONS

Dol, et al., "Requirements for Asbestos Substitutes for Jointing, Packing and Sealing Materials," Shell International Petroleum Maatschappij B.V., The Hague, May 1992.
International Preliminary Report on Patentability PCT/GB2006/000084.
International Search Report PCT/GB2008/000084.
Gooding, et al. in "Fractionation in a Bauer-McNett Classifier", Journal of Pulp and Paper Science: vol. 27, No. 12, Dec. 2001.
Marrion, Alastair, "The Chemistry and Physics of Coatings", Royal Society of Chemistry, 1994, pp. 42-51, pp. 60-61, and pp. 142-143.
Smook, G.A., "Handbook for Pulp & Paper Technologists", Joint Textbook Committee of the Paper Industry, 1982, pp. 208-395.

(Continued)

*Primary Examiner* — Chinessa T. Golden
(74) *Attorney, Agent, or Firm* — Kilpatrick Townsend & Stockton LLP

(57) ABSTRACT

A gasket material comprising a fibre component, a rubber component and a further resilient material is described. The further resilient material comprises chemically exfoliated vermiculite (CEV). A novel process of production is also described. The product has high stress retention and excellent sealing performance at high temperatures. Preferably, the gas permeability of the gasket material is less than 1.0 ml/min and the hot creep of the gasket material is less than 15%.

14 Claims, No Drawings

(56) References Cited

U.S. PATENT DOCUMENTS

| | | | |
|---|---|---|---|
| 4,859,526 A * | 8/1989 | Potepan et al. | 442/136 |
| 4,877,551 A | 10/1989 | Lukacs, III | |
| 4,915,871 A | 4/1990 | Atkinson et al. | |
| 4,929,429 A | 5/1990 | Merry | |
| 4,961,988 A | 10/1990 | Zhu | |
| 4,962,938 A | 10/1990 | Cooper | |
| 4,965,117 A | 10/1990 | Lautenschlaeger et al. | |
| 5,028,397 A | 7/1991 | Merry | |
| 5,139,615 A | 8/1992 | Conner et al. | |
| 5,183,704 A * | 2/1993 | Bohrn et al. | 428/305.5 |
| 5,240,766 A * | 8/1993 | Foster | 428/297.4 |
| 5,336,348 A | 8/1994 | Mindler | |
| 5,437,767 A * | 8/1995 | Halout et al. | 162/145 |
| 5,437,920 A * | 8/1995 | Bauer | C04B 26/00 277/591 |
| 5,472,214 A | 12/1995 | Wainer et al. | |
| 5,472,995 A * | 12/1995 | Kaminski et al. | 523/155 |
| 5,536,565 A | 7/1996 | Halout et al. | |
| 5,869,010 A | 2/1999 | Langer | |
| 5,913,522 A | 6/1999 | Koch | |
| 6,121,360 A * | 9/2000 | Hoyes et al. | 524/445 |
| 6,270,083 B1 | 8/2001 | Hirschvogel et al. | |
| 6,399,204 B1 * | 6/2002 | Shekleton | B32B 5/02 252/502 |
| 6,610,771 B1 * | 8/2003 | Hoyes et al. | 524/445 |
| 6,626,439 B1 * | 9/2003 | Forry et al. | 277/592 |
| 6,682,081 B2 | 1/2004 | Burton et al. | |
| 6,948,717 B1 | 9/2005 | Carr | |
| 7,121,556 B2 | 10/2006 | Barth et al. | |
| 7,321,009 B2 | 1/2008 | Hoyes et al. | |
| 2003/0132579 A1 * | 7/2003 | Hoyes et al. | 277/610 |
| 2004/0214032 A1 | 10/2004 | Hoyes et al. | |
| 2005/0006858 A1 | 1/2005 | Hoyes et al. | |
| 2005/0284595 A1 * | 12/2005 | Conley et al. | 162/146 |
| 2008/0012324 A1 | 1/2008 | Dole et al. | |

FOREIGN PATENT DOCUMENTS

| | | |
|---|---|---|
| EP | 0328293 | 8/1989 |
| EP | 0331987 A2 | 9/1989 |
| EP | 0339343 | 11/1989 |
| EP | 0379636 | 8/1990 |
| EP | 0523339 | 1/1993 |
| GB | 1541013 A * | 2/1979 |
| GB | 2094821 B | 9/1982 |
| GB | 2122699 | 1/1984 |
| GB | 2123034 | 1/1984 |
| GB | 2193953 | 2/1988 |
| GB | 2204266 A | 11/1988 |
| GB | 2217742 | 11/1989 |
| GB | 2236756 A | 4/1991 |
| GB | 2325496 | 11/1998 |
| GB | 2325497 | 11/1998 |
| GB | 2346888 | 8/2000 |
| JP | S61-132274 | 11/1976 |
| JP | 55002060 | 1/1980 |
| JP | 56086264 | 7/1981 |
| JP | 56-156437 | 12/1981 |
| JP | 57006158 | 1/1982 |
| JP | 61120880 | 6/1986 |
| JP | S63-031437 | 2/1988 |
| JP | 63183976 | 7/1988 |
| JP | 01-311130 | 12/1989 |
| JP | 1313321 | 12/1989 |
| JP | 3197027 | 8/1991 |
| JP | 3229785 | 10/1991 |
| JP | 3234971 | 10/1991 |
| JP | 05-070763 | 3/1993 |
| JP | 5140535 | 6/1993 |
| JP | 5171134 | 7/1993 |
| JP | H07502562 | 3/1995 |
| JP | H7-505660 | 6/1995 |
| JP | 8217919 | 8/1996 |
| JP | 10-199747 | 7/1998 |
| JP | H11-50047 | 2/1999 |
| JP | 11-1110781 | 4/1999 |
| JP | 2000-081143 | 3/2000 |
| JP | 2002-502448 | 1/2002 |
| JP | 2002-194331 | 7/2002 |
| JP | 2003519785 | 6/2003 |
| JP | 2006-234157 | 9/2006 |
| JP | 2010-159428 | 7/2010 |
| WO | 93-04118 | 3/1993 |
| WO | 94-02760 | 2/1994 |
| WO | WO-1994002760 | 2/1994 |
| WO | WO 97/02219 | 1/1997 |
| WO | 98-39585 | 9/1998 |
| WO | 98-53022 | 11/1998 |
| WO | WO-1998053022 | 11/1998 |
| WO | 01-51834 | 7/2001 |
| WO | WO-2003004578 | 1/2003 |

OTHER PUBLICATIONS

Office Action dated Dec. 31, 2008 in related EP patent application 06703312.6 derived from PCT/GB2006/000084.

Response and Amendment to Examiner's Communication dated Aug. 11, 2010 in related EP patent application 06703312.6 derived from PCT/GB2006/000084.

Search Report under Section 17 dated Sep. 24, 1997 in related GB patent application 9712117.2.

Search Report under Section 17 dated Sep. 24, 1997 in related GB patent application 9710305.5.

Search Report under Section 17 dated Sep. 24, 1997 in related GB patent application 9710298.2.

International Search Report dated May 7, 1999 in related International Application No. PCT/GB98/01309.

Office Action Summary undated in related U.S. Appl. No. 09/424,123.

Office Communication dated Oct. 9, 2009 in related EP Application No. 01104077.1.

Office Communication dated Jul. 12, 2010 in related EP Application No. 00107663.7.

European Search Report dated May 14, 2008 in related EP Application No. EP00107663.

International Search Report dated Mar. 3, 2001 in related International Application No. PCT/GB01/00097.

International Preliminary Examination Report dated Mar. 14, 2002 in related International Application No. PCT/GB01/00097.

Final Office Action dated Mar. 23, 2005 in related U.S. Appl. No. 10/181,116.

Non Final Office Action dated Sep. 25, 2008 in related U.S. Appl. No. 10/886,736.

Non Final Office Action dated Apr. 6, 2007 in related U.S. Appl. No. 10/886,736.

International Search Report dated Oct. 23, 2002 in related International Application No. PCT/GB02/03062.

International Preliminary Examination Report dated Feb. 12, 2003 in related International Application No. PCT/GB02/03062.

Office Communication dated Sep. 2, 2008 in related EP Application No. 02740931.7.

Office Communication dated May 4, 2009 in related EP Application No. 02740931.7.

Office Communication dated Nov. 27, 2009 in related EP Application No. 02740931.7.

Office Communication dated Apr. 27, 2010 in related EP Application No. 02740931.7.

Office Communication dated Aug. 4, 2010 in related EP Application No. 02740931.7.

International Preliminary Examination Report dated May 7, 1999 in related International Application No. PCT/GB98/01309.

Office Action dated Jan. 17, 2011 in related Korean patent application 10-2007-7105765.

Office Action dated Jan. 18, 2011 in related Japanese patent application 2001-552008.

Office Communication dated Jun. 8, 2011 in related EP Application No. 01104077.1.

(56) References Cited

OTHER PUBLICATIONS

Office Communication dated Jul. 20, 2011 in related EP Application No. 06703312.6.
Office Action dated Sep. 22, 2011 in related Japanese patent application 2009-010658.
Notice of Allowance in related U.S. Appl. No. 10/886,736 dated Jul. 8, 2014, 15 pages.
Ciullo, Peter A., "Industrial Minerals and Their Uses: A Handbook and Formulary", Elsevier Science, Dec. 1996, 9 pages.

* cited by examiner

GASKET MATERIAL AND ITS PROCESS OF PRODUCTION

FIELD

The present invention relates to a gasket material and, in particular, a gasket material produced by "it" calendering.

BACKGROUND

The "it" calendering process was invented before 1900. The "it" calendering process is described for example in the specification of British patent No. 1541013. The process is well-known so it is unnecessary for it to be described in great detail. In "it" calendering, a sheet material is built up as a series of very thin layers, e.g. 0.0004 inch, which are successively formed on the circumference of a heated calender bowl. Sheet formation is by feeding a relatively stiff, fibre filled and curable elastomeric dough to a nip between the calendar bowl and an unheated auxiliary roller, the nip separation being adjusted continuously or stepwise to achieve the desired rate of sheet build-up and consolidation. In this process an elastomer dough comprising fibres, elastomer, organic solvent, filler and curing agent is progressively formed into a sheet on the surface of a heated cylinder. The sheet is built up gradually as a series of very thin layers, to allow the solvent to evaporate from the dough during curing. When a desired thickness has been achieved, the cured sheet is cut a cross and removed from the cylinder, for processing into gaskets or other products.

The foregoing process was originally used to make asbestos—and more recently glass-fibre reinforced elastomer bonded sheets.

GB 2204266 describes the use of a hammer milled cellulose fibre in the it calendered process using toluene as solvent at 50% by weight of the dough.

It is known that fibrillating fibres such as para-aramids can be mixed with a rubber solution, optionally with fillers present, and then be subjected to "it" calendering. The rubber solution fills the interstices of the fibrillating fibre mesh as the solvent evaporates and thereby forms a rubber gasket supported by the fibrous material.

"It" calendering is typically carried out in this way using an organic solvent-based elastomer as the resilient material.

Chemically exfoliated vermicutite (CEV) based gasket materials are known to have high stress retention, high load bearing capability, high chemical resistance and improved sealing performance at high temperatures. CEV materials usually require a core material. Although foils without a support material have been successfully produced with good processing properties, increased strength and flexibility would be advantageous in some applications.

DETAILED DESCRIPTION

Surprisingly, it has been found that CEV, a water-based resilient material, can also be utilised to at least partially replace the rubber. It is not clear if the insterstices of the fibrillating fibre mesh are also filled by the CEV after water evaporation or whether the CEV is incorporated by another mechanism.

According to a first aspect of the present invention there is provided a gasket material comprising a fibre component, a rubber component and a further resilient material, wherein the further resilient material comprises chemically exfoliated vermiculite CEV.

Advantageously, by using CEV in combination with the fibrillating fibre much lower levels of rubber are required in the gasket material. Furthermore, a coreless CEV gasket material can be produced as the fibrillating fibre provides the CEV based product with sufficient integrity in use to avoid the requirement for a core.

Low levels of rubber are advantageous because they result in lower levels of organic material in the final product, high stress retention, high load bearing capability and a reduced reduction in sealing performance at higher temperatures as CEV out-performs rubber at high temperatures.

In addition, a material made in accordance with the invention is surprisingly flexible.

Preferably, the gas permeability of the gasket material is less than 1.0 ml/min, more preferably less than 0.5 ml/min, most preferably less than 0.15 ml/min.

Gas permeability is determined by BS 7531:1992, Appendix E.

Preferably, the hot creep of the gasket material is less than 15%, more preferably less than 11%, most preferably less than 7%.

Hot creep is determined by BSF130:1987, Appendix B.

Preferably, the rubber component is present at a level of less than 10% w/w, more preferably, less than 8% w/w, most preferably less than 6% w/w in the final dried gasket material.

Preferably, the gasket material is in the form of a sheet. Preferably, the sheet is made by an "it" calendering technique.

Preferably, the fibre component comprises a fibrillating fibre component and, preferably, a further fibre component.

Preferably, the fibrillating fibre component comprises a suitable fibrillating fibre such as a para-aramid or cellulose. More preferably, the fibrillating fibre is a para-aramid. Most preferably, the para-aramid is Kevlar®, Twaron® and/or Armos®, especially Kevlar®, and/or Twaron® suitable fibrillating fibre grades. Preferably, the further fibre component comprises a man-made mineral fibre such as rock wool. Preferably, the further fibre is a spun fibre, optionally surface treated. Examples of a suitable rock wool component includes Rockseal® RS401-Roxul® 1000 and RF 51 (BB)6 available from Lapinus Fibres BV.

Suitable rubbers for use with the present invention include any suitable elastomer such as silicon and carbon based elastomeric polymers. Suitable materials include natural rubber and synthetic rubbers such as nitrile butadiene rubbers, styrene butadiene rubbers, butyl rubber, siloxanes (particularly organosiloxanes such as dialkyl siloxanes) and dienes such as ethylene-propyldiene monomer.

Preferably, the further resilient material comprises 1-95% w/w of the final dried gasket, more preferably, 20-90% w/w, most preferably, 50-85% w/w of the final dried gasket.

Optionally, the CEV component is at least partially derived from dry CEV. Preferably, the CEV component of the further resilient material is at least 25% w/w of the further resilient material.

Preferably, the further resilient material further comprises a plate like filler material, preferably, a milled filler material.

Preferably, the proportion of CEV is at least 30% w/w of the further resilient material, more preferably, at least 35% w/w.

Typically, the level of CEV falls within the range 1-99% w/w of the further resilient material, more typically 10-90% w/w, most typically, 30-70%.

Preferably, the CEV solids content prior to addition to the dough mix is 15-50% w/w, more preferably, 20-45% w/w, most preferably, 20-40% w/w.

Optionally, the chemically exfoliated vermiculite includes sufficient dry CEV to provide a wet gasket dough material, with a reduced water content for subsequent "it" calendering.

Preferably, prior to calendering the dough material has a moisture content of between 10-50% w/w, more preferably, 15-45% w/w most preferably, 20-40% w/w prior to "it" calendering.

Preferably, the fibre component is present at a level of 6-70% w/w, more preferably, 17-60%, most preferably 25-50% w/w in the final dried gasket.

Preferably, the fibrillating fibre comprises between 1-25% w/w of the final dried gasket, more preferably, 2-20%, most preferably 3-15% w/w. An especially preferred level is 3-10% w/w. Preferably, the further fibre comprises 5-45% w/w of the final dried gasket, more preferably, 15-40% w/w, most preferably 22-35% w/w of the gasket.

Preferably, the average fibrillating fibre length is between 100 and 3000 microns, more preferably, between 300 and 2000, most preferably between 500 and 1500. Typically, the fibre length is greater than 500 microns. Fibre length being measured by Kajaani Analyser e.g. the FS200 or FS300 and using TAPPI T271.

Preferably, the average fibrillating fibre trunk diameter is between 1 and 50 microns, more preferably, between 2 and 30 microns, most preferably between 5 and 20 microns.

Preferably, the average fibril diameter is between 0.05 and 5 microns, more preferably, between 0.1 and 2 microns, most preferably, between 0.2 and 0.8 microns.

Trunk fibrillating fibre and fibril fibre diameters may be determined by Canadian Freeness Tester method ISO 5267-21980 or Tappi T227.

Preferably, the average further fibre length is between 30 and 500 microns, more preferably, between 50 and 450, most preferably between 80 and 400.

Preferably, the numerical average further fibre diameter is between 0.1 and 15 microns, more preferably, between 1 and 15 microns, most preferably, between 3 and 15 microns.

Preferably, the mass weighted average further fibre diameter is between 0.1 and 25 microns, more preferably, between 1 and 20 microns, most preferably, between 5 and 15 microns.

Average further fibre length may be determined by any suitable technique using standards to normalise the results. For instance, fibre length can be determined using Lapinus Fibres BV test method "TV 305" which is based on ISO standard 137.

Measure Principle TV 305: Fibre Length

The length of the fibers is measured automatically using a microscope, with camera and image analysing software. For an accurate automatic determination it is important to prepare a well dispersed sample on a Petri dish. A sample is heat cleaned at 590° C. during 10 minutes.

0.4 Gram of the heat cleaned fibers is dispersed, by the use of an ultrasonic in 36 ml dispersing solution (ethyleneglycol 49.5% vol, water 49.5. % vol and 1% non foaming dispersing aid). 0.7 ml of this dispersion is again diluted in 36 ml dispersing solution. 0.7 ml of this dispersion is applied on a Petri dish and divided thoroughly on the surface A microscope with a magnification of 1.25*1 is used to measure the length of the fibers. Afterwards an excel macro is used to calculate the weighted average length.

For the reproducibility of results, the number of measurements must be higher than 500

Numerical average and Mass Weighted average further fibre diameter are also determined by any suitable technique using standards to normalise the results, for instance, fibre diameter can be determined using the TV165 test method of Lapinus Fibres BV which is based on ISO 137.

Measure Principle TV 165: Fibre Diameter and Specific Surface Area.

The diameter of the fibers is measured automatically using a microscope, with camera and image analysing software. For an accurate automatic determination it is important to prepare a well dispersed sample on a Petri dish.

A sample is heat cleaned at 590° C. during 10 minutes. Then the sample is pressed to obtain a length of approximately 30 microns.

0.05 Gram of the pressed fibers is dispersed, by the use of an ultrasonic, in 36 ml dispersing solution (ethyleneglycol 49.5% vol, water 49.5% vol and 1% non foaming dispersing aid). 0.05 ml of this dispersion is applied on a Petri dish and thoroughly divided on the surface.

A microscope with a magnification of 1.25*10 is used to measure the diameter of the fibres. Afterwards an excel macro is used to calculate the numeric average diameter, mass weighted average diameter and specific area.

For the reproducibility of results, the number of measurements must be between 1000-1200

Alternatively, further fibre length may be determined by Kajaani Analyser such as the FS 200 or FS300 using Tappi T271 and further fibre diameter may be determined by Canadian Freeness tester as mentioned above.

Preferably, the CEV of the further resilient material is mixed with a suitable filling agent, preferably, a plate-like filling agent such as a gas exfoliated vermiculite, preferably, thermally exfoliated vermiculite (TEV). Preferably, the filling agent is milled. Preferably, the filling agent comprises less than 65% w/w of the final dried gasket, more preferably, less than 60% w/w, most preferably, less than 50% w/w of the final dried gasket material. In many cases the TEV content in the final dried gasket is less than 40% w/w.

Preferably, when present the relative ratio of non-dry derived CEV to dry derived CEV in the dried gasket material is between 0.01:1 and 20:1, more preferably between 0.05:1 and 10:1, most preferably between 0.1:1 and 4:1.

The filling agent material used may be milled or otherwise reduced in particle size to a particle size of less than 50 μm, however, preferably, the average particle size is more than 50 μm, preferably, 50-300 μm, more preferably 50-250 μm, most preferably 50-200 μm. Other possible additives include talc, mica and unexfoliated vermiculite.

By dry CEV is meant CEV having a moisture content of less than 20% w/w, more preferably, less than 10% w/w, most preferably, less than 5% w/w.

Optionally, the CEV component in the gasket material dough comprises a mixture of dried CEV and CEV available in a slurry form. However, in any case, it is necessary to use CEV at an acceptable solids content as defined above. A high solids content in the wet dough material assists reduction in processing problems in a subsequent calendering process whilst maintaining a high solids content in accordance with the invention.

Preferably, the dry CEV is prepared by a suitable drying technique. Suitable drying techniques include:—
cake drying and pulverising;
film drying and pulverising;
rotary hot air drying;
spray drying;
freeze drying;
pneumatic drying;
fluidised bed drying of partially dried solid; and
vacuum methods including vacuum shelf drying.

Preferably, any of the features or any preferred features of any aspect of the present invention may be combined in any non mutually exclusive combination with the first aspect and/or second and/or further aspects.

When utilised, the rubber may be coupled to the vermiculite by a coupling agent.

The coupling agent may be a silane, e.g. a vinyl functional silane such as triethoxy vinyl silane $(CH_3CH_2O)_3SiCH=CH_2$.

It is also possible for the resilient material to comprise unexfoliated (intumescent) vermiculite which can, on heating of the gasket, eg in situ, form TEV to swell the resilient layer and, thus improve sealing.

In a gasket material according to any aspect of the invention, it is found that the particles of the plate-like filler when present, tend to orientate themselves into the plane of the gasket and act like a large number of tiny leaf springs, thereby improving sealing.

In accordance with any aspect of the present invention the plate-like filler may be selected from the group consisting of talc, molybdenum disulphide, hexagonal boron nitride, soapstone, pyrophyllite, milled thermally exfoliated vermiculite, mica, fluoromica, powdered graphite, glass flake, metal flake, ceramic flake, or kaolinites. However, a particularly preferred vermiculite material is one with a average plate size in the range 50-300 µm for example FPSV available from W R Grace & Co. FPSV is a registered trade mark of W R Grace & Co.

In general, a plate-like filler has an average width of plates of at least three times the average thickness.

The gasket material may comprise 5-80%, eg 20-50%, by weight of the plate-like filler, preferably, 25-40% of the plate like filler is present in the final dried gasket.

Optionally, the filling agent of any aspect of the present invention also comprises an intumescent material selected so that it expands at temperatures at which any rubber polymer degrades.

The gasket of the present invention may be utilised in a spirally wound gasket.

In a gasket according to this optional feature of the invention, at temperatures which cause the rubber to degrade, an intumescent material may expand to at least partially fill the void left by the rubber, thereby helping to maintain sealing.

Preferably, the intumescent material is unexfoliated vermiculite because, after exfoliation, it has good heat resistance. Another possibility is to use partially exfoliated vermiculite, i.e. vermiculite which has been exfoliated at a lower temperature than is normally required to fully exfoliate it. The unexfoliated or partially exfoliated vermiculite may be treated (by methods which are known per se) to reduce the temperature at which exfoliation occurs, eg the temperature can be reduced to as low as 160° C. Other possible intumescent materials include expandable graphite, sodium silicate, and perlite.

In accordance with a second aspect of the present invention there is provided a process for the production of a gasket material comprising the steps of:
mixing a fibre component and CEV into a wet dough,
"it" calendering the said wet dough.

Preferably, the wet dough comprises a rubber component.

Surprisingly, it has been found possible to it calender an aqueous dough into a sheet of gasket material. Typically, "it" calendering is carried out on a solvent based rubber material and a fibrillating fibre but it has been found that a wet CEV sealing layer dough can also successfully incorporate the fibrillating fibres and also be successfully formed into a laminate sheet of calendered material.

Preferably, a gasket according to the invention comprises a plurality of laminated layers.

Typically, the "it" calendering includes deposition of a first primer layer, optionally comprising a rubber solution, typically followed by a start layer, optionally including para-aramid fibres, typically followed by deposition of the body layer being a wet dough comprising the gasket material component of the first aspect of the invention and solvent, typically followed by a finish layer.

The components of the first primer, start and finish layers are in accordance with those known in the art of "it" calendering but the start and finish layers may optionally be in accordance with any aspect or preferred feature of the present invention, preferably, in the absence of any fibre component.

Preferably, similarly, the wet dough may be in accordance with any of the aspects or preferred features mentioned hereinbefore.

Preferably, the roller speed during "it" calendering is optimised for curing, preferably between 0.1-7.5 rpm, more preferably, 0.5-5.0 rpm, most preferably, 0.5-3.0 rpm.

Preferably, the load across the nip is between 1-30 tonnes per 1.5 m wide nip, more preferably, 3-25 tonnes per 1.5 m wide nip, most preferably, 5-20 tonnes per 1.5 m wide nip.

The temperature of the hot bowl is preferably, at a suitable curing temperature, preferably between 80-200° C., more preferably, 90-170° C., most preferably, 100-160° C. The temperature of the cold bowl is less than 70° C., more preferably, less than 50° C., most preferably, less than 30° C. In any case, the cold bowl is less than the temperature of the hot bowl. The cold bowl would typically be operated above 0° C.

Preferably, the thickness of the final dried gasket is between 0.1 mm-10 mm, more preferably, 0.25-6 mm, most preferably, 0.5-4 mm.

Preferably, the process of the invention includes the step of cutting the laminate from the calender hot bowl to thereby form a flat sheet of gasket material of the required thickness.

The gasket material of the present invention may also include other additives such as curing agents, coupling agents, antioxidants, and processing aids (e.g. dispersants, surfactants, etc) humectants, other fillers and pigments. To prepare a calender for use with such a dough, the surface of the heated bowl may be primed with a solution of unsecured elastomer composition in solvent, to control the degree of adhesion of the dough at the start and end of calendering.

Embodiments of the invention will now be described by way of example only.

Gasket Example 1

This example was made up to have a body (core) portion (formulation 1) with surface layer portions of a different formulation (formulation 2).

Body Formulation 1

| Formulation | kg |
|---|---|
| Rockwool Fibre (Roxul 1000 from Lapinus Fibres) | 20.0 |
| Aramid Fibre (opened) (Kevlar from Dupont) | 14.0 |
| Nitrile Butadiene Rubber (NBR) Solution† | 35.0 WET (5.6 kg DRY) |
| Thermally Exfoliated Vermiculite (Grace FPSV) | 28.0 |
| Chemically Exfoliated Vermiculite (Grace PCEV Powder) | 20.5 |
| Chemically Exfoliated Vermiculite (Grace HTS Dispersion) | 75.0 WET (11.25 kg DRY) |
| Silane Coupling Agent (Silquest A 151) | 0.8 WET (0.44 kg DRY) |
| Cure System* | 1.46 |
| Water | 6.0 |

*Cure System:-
| | |
|---|---|
| ZDC | 0.085 kg (Zinc diethyldithiocarbamate) |
| TMTD | 0.450 kg (Tetramethylthiuram disulphide) |
| Stearic Acid | 0.085 kg |
| Sulphur | 0.420 kg |
| Zinc Oxide | 0.420 kg |

Mixing

This mixing is carried out in a ploughshare mixer (Solitec) in accordance with the following procedure and at a mixing speed of 150 rpm and at ambient temperature.

| | |
|---|---|
| 0 Minutes | Add Rockwool fibres; Aramid fibres; Nitrile rubber solution and Cure system |
| 5 | Add Chemically Exfoliated Vermiculite Dispersion |
| 10 | Add Chemically Exfoliated Vermiculite Powder, Thermally Exfoliated Vermiculite and Silane coupling agent |
| 30 | Add Water |
| 40 | Remove from mixer |

Start and Finish Surface

Formulation 2

| Formulation | |
|---|---|
| Thermally Exfoliated Vermiculite (Grace FPSV Powder) | 21.5 kg |
| Chemically Exfoliated Vermiculite (Grace PCEV Powder) | 11.4 kg |
| Chemically Exfoliated Vermiculite Grace HTS Dispersion) | 60.9 kg WET (9.135 kg DRY) |
| NBR Solution† | 7.0 kg WET (1.12 kg DRY) |
| Silane Coupling Agent (Silquest A151) | 0.75 kg WET (0.21 kg DRY) |

†The NBR used in the solution is Arnipol BLT available from Wex Chemicals, London (which is present at a loading of 16% by weight in toluene).

Mixing

The mixer used is a 'GR' mixer which resembles a large industrial food mixer: available from Baker Perkins Chemical Machinery Ltd., Stoke-on-Trent.

The mixer was used at a speed of 50 rpm.

Cycle:
a) Add 30.9 kg dispersion to the mixer pan followed by all the dry powders: Mix for 10 minutes.
b) Add silane and mix for 5 minutes.
c) Add NBR solution and mix for 10 minutes.
d) Add remaining HTS dispersion in three equal lots of 10 kg each allowing 5 minutes mixing between each addition.
e) Mix for a further 15 minutes. Then remove from mixer.

Calendering

Primer Layer: Natural Rubber #/Toluene solution (1 kg natural rubber per 15 kg toluene
Start Surface Formulation 2
Body: Formulation 1
Finish Surface Formulation 2
Calender: 1.5 m wide; 6 m circumference
    Hot bowl steam heated to 105-115° C. surface temperature
    Initial Nip load 5-7 tonnes
    Working Nip load 13-15 tonnes
-TSR20: "Brown Crepe Rubber" from Hecht, Heyworth & Alcon.

The calender was run with a hot bowl temperature of 105-115° C. and an initial surface speed of about 18 m/minute (3 rpm). 250 mL of a natural rubber/toluene solution (Primer Layer) comprising 1 kg natural rubber dissolved in 15 kg toluene was applied to the calender nip followed by 2.5 kg of formulation 2, 42 kg of Body formulation 1 and 2.5 kg of Finish Surface formulation 2 to give a 1.6 mm thick roll of the desired product with a core and surface layers. During the build-up of the roll the surface speed of the hot bowl was reduced progressively to 6 m/minute to ensure that the body ran cleanly on the calender bowl and produced a sheet with a smooth surface finish.

The Primer Layer and Start Surface were applied with the nip load at the calender set at 5-7 tonnes: this load was allowed to build up to preset level of 13 tonnes [attained at an approximate thickness of 0.2 mm]. Towards the end of the roll the nip load at the calender was increased to 15 tonnes to ensure that the Finish Surface went on smoothly.

The calender was then stopped and the roll was removed from the hot bowl.

Gasket Example 2

This example was made up to have a start surface layer (formulation 3), a body (core) portion (formulation 4) and a finish portion (formulation 5).

Start Surface

Formulation 3

| Formulation | kg |
|---|---|
| Aramid Fibre (Kevlar from DuPont) | 5.0 |
| Natural Rubber (crumb)# | 3.5 |
| Nitrile Rubber/Silica masterbatch (crumb)ˣ (100 parts Nitrile Rubber + 70 parts Silica) | 3.0 |
| NBR (crumb) (SEETEC B6280 from Hubron Ltd) | 3.0 |
| Thermally Exfoliated Vermiculite (Grace FPSV) | 5.0 |
| Silica Flour (Quartz) (HPF2 Silica Flour from WBB Minerals) | 19.0 |
| Calcined Clay (Polarite from English China Clays) | 5.0 |
| Iron Oxide Pigment (Burnt Sienna Grade FP301816 from W Hawley & Son Ltd | 2.0 |
| Cure System* | 0.795 |
| Silane Coupling Agent (Silquest A 151) | 0.18 (WET) (0.099 DRY) |
| Toluene | 34.68 (=40 L) |
| Water | 4.3 |

*Cure System:-
ZDC         0.035 kg (Zinc diethyldithiocarbamate)
TMTD       0.110 kg (Tetramethylthiuram disulphide)
Stearic Acid  0.050 kg
Sulphur    0.100 kg
Zinc Oxide  0.500 kg
Natural Rubber (crumb) refers to TSR20: "Brown Crepe Rubber" available from Hecht, Heyworth & Alcan.
ˣNitrile Rubber/Silica masterbatch (crumb) is made by compounding 100 parts of Nitrile Rubber (SEETEC B6280 from Hubron Ltd) and 70 parts of amorphous silica (Rubbersil RS200P from Hubron Ltd) having a high surface area (eg. 180 $m^2/g$).

Mixing

This mixing is carried out in a ploughshare mixer (Lodige-Morton) in accordance with the following procedure and at a mixing speed of 150 rpm and at ambient temperature.

| | |
|---|---|
| 0 Minutes | Add Aramid Fibres |
| 5 | Add Natural Rubber, Nitrile Rubber/Silica Masterbatch, Nitrile Rubber and 30 L Toluene |
| 25 | Add Thermally Exfoliated Vermiculite, Silica Flour, Calcined Clay, Iron Oxide Pigment and Cure System |
| 45 | Add 10 L Toluene |
| 70 | Add Water |
| 75 | Remove from mixer |

Body

Formulation 4

| Formulation | kg |
|---|---|
| Rockwool Fibre (Roxul 1000 from Lapinus Fibres) | 32.0 |
| Aramid Fibre (Kevlar from DuPont) | 7.5 |
| NBR Solution† | 30.0 WET (4.8 kg DRY) |
| Thermally Exfoliated Vermiculite (Grace FPSV) | 28.0 |
| Chemically Exfoliated Vermiculite (Grace PCEV Powder) | 22.75 |
| Chemically Exfoliated Vermiculite (Grace HTS Dispersion) | 60.0 WET (9.0 kg DRY) |
| Cure System* | 1.245 |
| Silane Coupling Agent (Silquest A 151) | 0.8 WET (0.44 kg DRY) |

| *Cure System:- | kg |
|---|---|
| ZDC | 0.070 (Zinc diethyldithiocarbamate) |
| TMTD | 0.385 (Tetramethylthiuram disulphide) |
| Stearic Acid | 0.070 |
| Sulphur | 0.360 |
| Zinc Oxide | 0.360 |

Mixing

This mixing is carried out in a ploughshare mixer (Solitec) in accordance with the following procedure and at a mixing speed of 150 rpm and at ambient temperature.

| 0 Minutes | Add Aramid Fibres, Rockwool Fibres and Cure System |
|---|---|
| 10 | Add NBR Solution |
| 15 | Add Chemically Exfoliated Vermiculite Dispersion |
| 20 | Add Chemically Exfoliated Vermiculite Powder, Thermally Exfoliated Vermiculite and Silane Coupling Agent |
| 50 | Remove from mixer |

Finish

Formulation 5

| Formulation | kg |
|---|---|
| Rockwool Fibre (Roxul 1000 from Lapinus Fibres) | 32.0 |
| Aramid Fibre (Kevlar from DuPont) | 2.0 |
| NBR Solution† | 30.0 WET (4.8 kg DRY) |
| Thermally Exfoliated Vermiculite (Grace FPSV) | 28.0 |
| Chemically Exfoliated Vermiculite (Grace PCEV Powder) | 22.75 |
| Chemically Exfoliated Vermiculite (Grace HTS Dispersion) | 60.0 WET (9.0 kg DRY) |
| Cure System* | 1.245 |
| Silane Coupling Agent (Silquest A 151) | 0.8 WET (0.44 kg DRY) |

| *Cure System:- | kg |
|---|---|
| ZDC | 0.070 (Zinc diethyldithiocarbamate) |
| TMTD | 0.385 (Tetramethylthiuram disulphide) |
| Stearic Acid | 0.070 |
| Sulphur | 0.360 |
| Zinc Oxide | 0.360 |

Mixing

This mixing is carried out in a ploughshare mixer (Solitec) in accordance with the following procedure and at a mixing speed of 150 rpm and at ambient temperature.

| 0 Minutes | Add Aramid Fibres, Rockwool Fibres and Cure System |
|---|---|
| 10 | Add NBR Solution |
| 15 | Add Chemically Exfoliated Vermiculite Dispersion |
| 20 | Add Chemically Exfoliated Vermiculite Powder, Thermally Exfoliated Vermiculite and Silane Coupling Agent |
| 50 | Remove from mixer |

Calendering

Primer Layer: Natural Rubber #/Toluene solution (1 kg natural rubber per 15 kg toluene)
Start Surface Formulation 3
Body: Formulation 4
Finish: Formulation 5
Calender:—1.5 m wide; 6.0 m circumference
Hot bowl steam heated to 105-115° C. surface temperature
Initial Nip Load 5-7 tonnes
Working Nip Load 13-15 tonnes The calender was run with a hot bowl temperature of 105-115° C. and an initial surface speed of about 18 m/minute (3 rpm). 250 mL of a natural rubber/toluene solution (Primer Layer) comprising 1 kg natural rubber dissolved in 15 kg toluene was applied to the calender nip followed by 2.5 kg of Formulation 3. Formulation 4 (Body) was then added until the indicated sheet thickness was 1.25-1.35 mm. Formulation 5 (Finish) was then added to the nip until the required thickness of 1.5-1.6 mm was obtained.

During the build-up of the roll the surface speed of the hot bowl was reduced progressively to 6 m/minute to ensure that the Body and Finish ran cleanly on the calender bowl and produced a sheet with a smooth surface.

The Primer Layer and Start Surface were applied with the nip load set at 5-7 tonnes: this load was allowed to build-up to a preset level of 13 tonnes [attained at an approximate thickness of 0.2 mm]. Towards the end of the roll the nip load at the calender was increased to 15 tonnes to ensure that the Finish went on smoothly.

The calender was then stopped and the roll was removed from the hot bowl.

Test Results

Standard Tests

| Property | Test procedure | Gasket Example 1 |
|---|---|---|
| Thickness (mm) | BS 7531 | 1.56 |
| Density (g/cc) | ASTM F 1315 | 1.59 |
| BS Stress Retention @ 300° C. (MPa) | BS 7531 | 23.7 |
| ASTM Compressibility (%) | ASTM F 36 And BS 7531 | 13.6 |
| ASTM Recovery (%) | ASTM F 36 | 49 |
| ASTM Tensile Strength - With-grain (MPa) | ASTM F 152 | 21.8 |

-continued

| Property | Test procedure | Gasket Example 1 |
|---|---|---|
| ASTM Tensile Strength - Cross-grain (MPa) | ASTM F 152 | 10.8 |
| BS Gas Permeability (mL/min) | BS 7531 | 0.05 |

Comparative data showing test results for example 2 compared with other commercial material is shown in Table 1.

TABLE 1

| Property | Example 2 | Flexitallic SF 2400 | Flexitallic SF 3300 | Klinger C-4500 | Klinger C-4430 | Garlock 9900 | Garlock 9850 | Garlock 3000 |
|---|---|---|---|---|---|---|---|---|
| Thickness (mm) | 1.67 | 1.57 | 1.44 | 1.47 | 1.59 | 1.59 | 1.54 | 1.53 |
| Density (g/cc) | 1.75 | 1.87 | 1.85 | 1.58 | 1.68 | 1.86 | 1.67 | 1.76 |
| BS Stress Retention @ 300° C. (MPa) | 24.1 | 25.2 | 23.3 | 26.6 | 25.6 | 21.3 | 23.9 | 15.5 |
| DIN Stress Retention @ 300° C. (MPa) | | 32.1 | 30.3 | 29.2 | 31.5 | 22.5 | 24.7 | 20.2 |
| ASTM Tensile Strength - With-grain (MPa) | 19.2 | 33.1 | 36.1 | 26.6 | 21.1 | 36.8 | 36.9 | 41.1 |
| ASTM Tensile Strength - Cross-grain (Mpa) | 10.8 | 13.1 | 13.7 | 10.7 | 7.5 | 15.3 | 13.6 | 14.8 |
| ASTM Compressibility (%) | 11.7 | 6.2 | 6.7 | 8.6 | 8.1 | 9.5 | 8.5 | 6.8 |
| ASTM Recovery (%) | 46.6 | 50.0 | 54.4 | 66.7 | 67.1 | 57.8 | 57.1 | 59.7 |
| BS Gas Permeability (mL/min) | 0.10 | 0.12 | 0.07 | 0.08 | 0.41 | 0.007 | 0.033 | 0.007 |
| Thickness Increase Oil 3 (%) | 1.0 | 4.9 | 1.6 | 3.6 | 3.6 | 4.6 | 4.1 | 4.3 |
| Thickness Increase Fuel B (%) | 1.8 | 6.0 | 1.9 | 6.8 | 5.1 | 5.4 | 3.6 | 6.0 |
| Weight Increase Oil 3 (%) | 13.4 | 8.0 | 8.3 | 9.0 | 10.5 | 8.7 | 10.9 | 9.6 |
| Weight Increase Fuel B (%) | 11.9 | 6.7 | 5.3 | 8.7 | 7.6 | 5.5 | 6.5 | 8.1 |
| Ignition Loss % | 15.0 | 19.4 | 20.3 | 45.3 | 23.6 | 42.4 | 40.6 | 30.8 |
| ASTM Creep Relaxation (%) | 34.4 | 37.8 | 34.8 | 32.9 | 28.1 | 33.7 | 31.0 | 43.0 |
| ASTM Liquid Leakage (mL/hr) Fuel A @ 10 psi; stress 1000 psi | 1.4 | 2.4 | 1.8 | 1.8 | 3.6 | 1.8 | 2.4 | 3.0 |
| ASTM Liquid Leakage (mL/hr) Fuel A @ 50 psi; stress 1000 psi | 12.5 | 7.6 | 5.2 | 6.2 | 12.0 | 9.6 | 10.5 | 10.8 |
| BSF 130 Hot Creep (%) | 5.7 | 14.6 | 13.7 | 9.9 | 11.4 | 15.5 | 10.7 | 18.4 |

The BS F 130:1987 Hot Creep test is a determination of the thickness reduction of a gasket material under a realistic load at 300° C. [BSF 130 is a standard issued by BSi which fully details the test & the necessary test rig] The BS 7531:1992 Gas Permeability test provides a room temperature measure of the permeability of sheet gasket materials in a highly realistic manner with high pressure nitrogen as the test medium.

The generally accepted target for the hot creep result is 10% but lower results are desirable.

The example 2 formulation shows excellent hot creep results as this is an indication of the amount of material that burns off at operational temperature. Burn off causes reduction in thickness of the gasket and this leads to bolt extension and subsequent loss of bolt load. If bolt load is reduced significantly gasket failure can occur.

However, the test results also show that the excellent hot creep results are not at the expense of increased permeability of the sheet which can be a problem at such low levels of elastomeric material. Thus, the invention solves the problem of maintaining low gas permeability whilst having low creep at operational temperatures.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket material comprising:
   (a) a start layer comprising rubber;
   (b) a body layer on top of the start layer and comprising
      (i) a fiber component comprising a fibrillating fiber component and a mineral fiber component, wherein the total amount of fibrillating fiber component and mineral fiber component is 25-70% w/w of the gasket material,
      (ii) a rubber component derived from a rubber solution,
      (iii) a further resilient material in an amount of 1-95% w/w of the gasket material, wherein the further resilient material comprises a water-based chemically exfoliated vermiculite (CEV) component, and
      (iv) a filler material; and
   (c) a finish layer on top of the body layer and comprising rubber.

2. The gasket material according to claim 1, wherein the rubber component is present at a level of less than 10% w/w in the gasket material.

3. The gasket material according to claim 1, wherein the gasket material is in the form of a sheet.

4. The gasket material according to claim 1, wherein the further resilient material comprises 20-90% w/w of the gasket material.

5. The gasket material according to claim 1, wherein the CEV component is at least partially derived from dry CEV.

6. The gasket material according to claim 1, wherein the filler material is a plate filler material.

7. The gasket material according to claim 6, wherein the plate filler material is thermally exfoliated vermiculite.

8. The gasket material according to claim 1, wherein the fiber component is present at a level of 25-70% w/w of the gasket material.

9. The gasket material according to claim 1, wherein the fibrillating fiber component comprises between 1-25% w/w of the gasket material.

10. The gasket material according to claim 1, wherein the body layer comprises a plurality of laminated layers.

11. The gasket material of claim 1, wherein the gas permeability of the gasket material is less than 1.0 ml/min.

12. The gasket material according to claim 1, wherein the mineral fiber component comprises 5-45% w/w of the gasket material.

13. The gasket material according to claim 12, wherein the mineral fiber component comprises 15-40% w/w of the gasket material.

14. The gasket material according to claim 1, wherein the fibrillating fiber component comprises between 3-10% w/w of the gasket material and the mineral fiber component comprises 22-35% w/w of the gasket material.

* * * * *